July 12, 1938.  O. W. SODERSTROM  2,123,752
MACHINE FOR SHAPING THE ENDS OF COILED WIRE SPRINGS
Filed June 13, 1936  6 Sheets-Sheet 1

INVENTOR
OSCAR W. SODERSTROM
BY
ATTORNEY

July 12, 1938. O. W. SODERSTROM 2,123,752
MACHINE FOR SHAPING THE ENDS OF COILED WIRE SPRINGS
Filed June 13, 1936 6 Sheets-Sheet 2

INVENTOR
OSCAR W. SODERSTROM.
BY
ATTORNEY

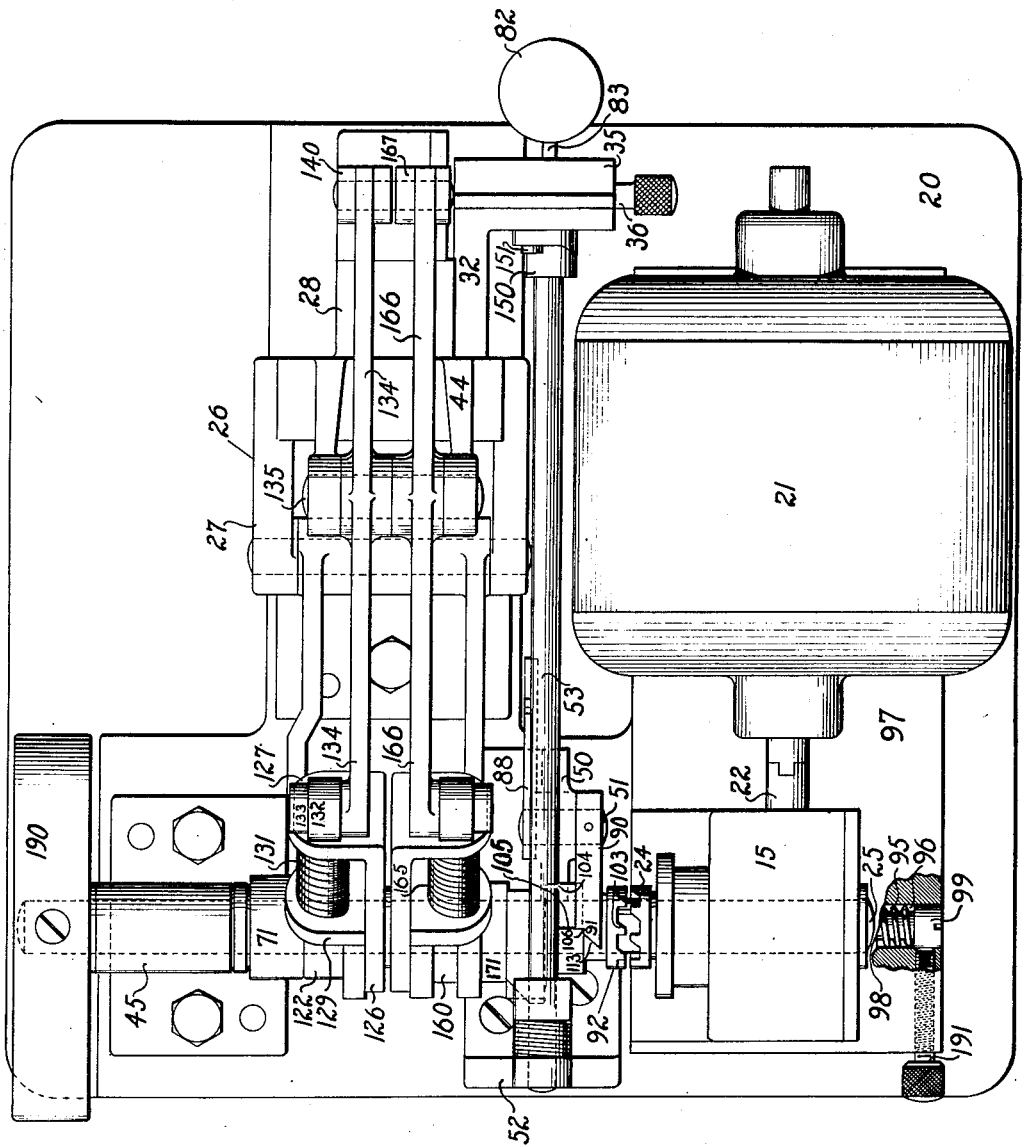

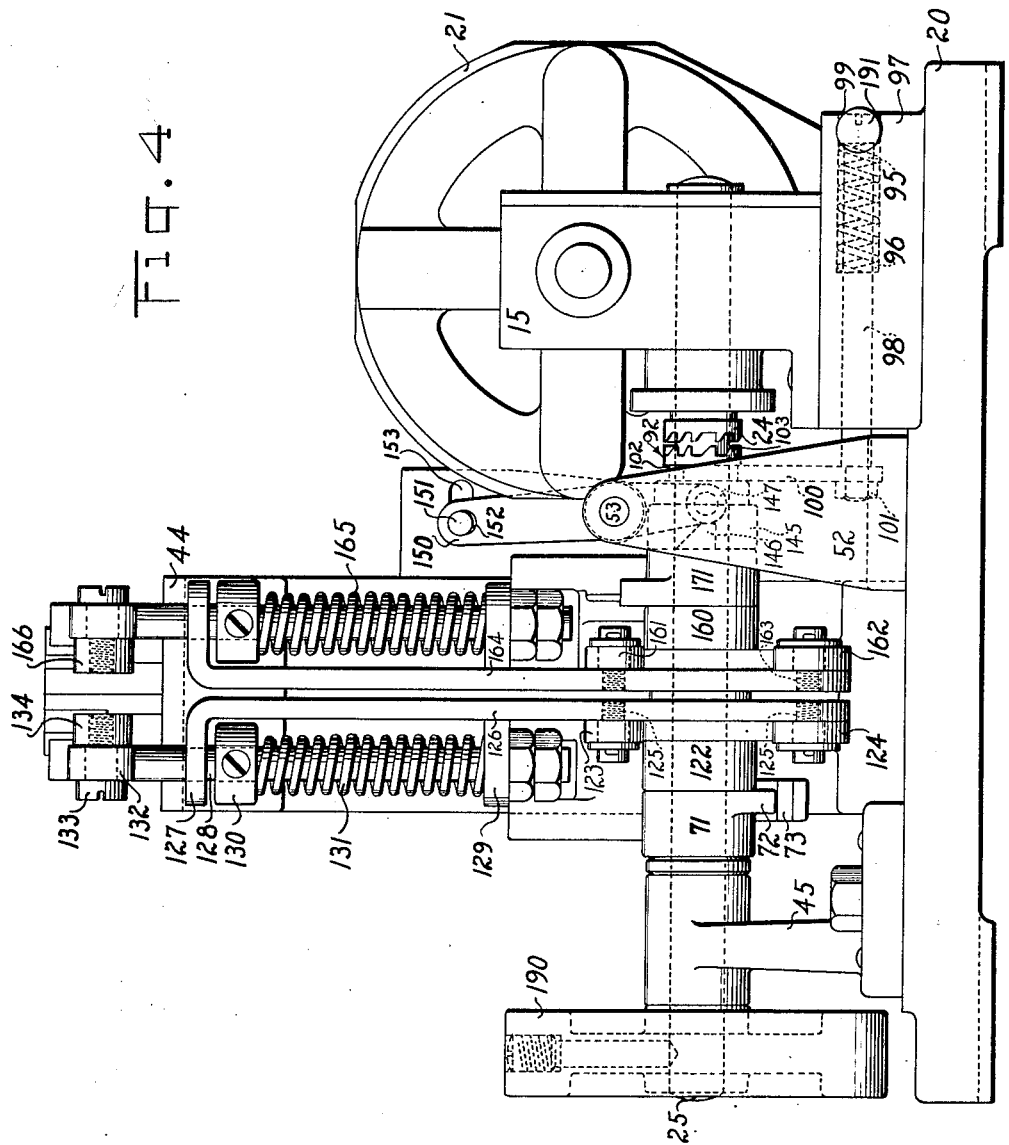

July 12, 1938.  O. W. SODERSTROM  2,123,752
MACHINE FOR SHAPING THE ENDS OF COILED WIRE SPRINGS
Filed June 13, 1936  6 Sheets-Sheet 5
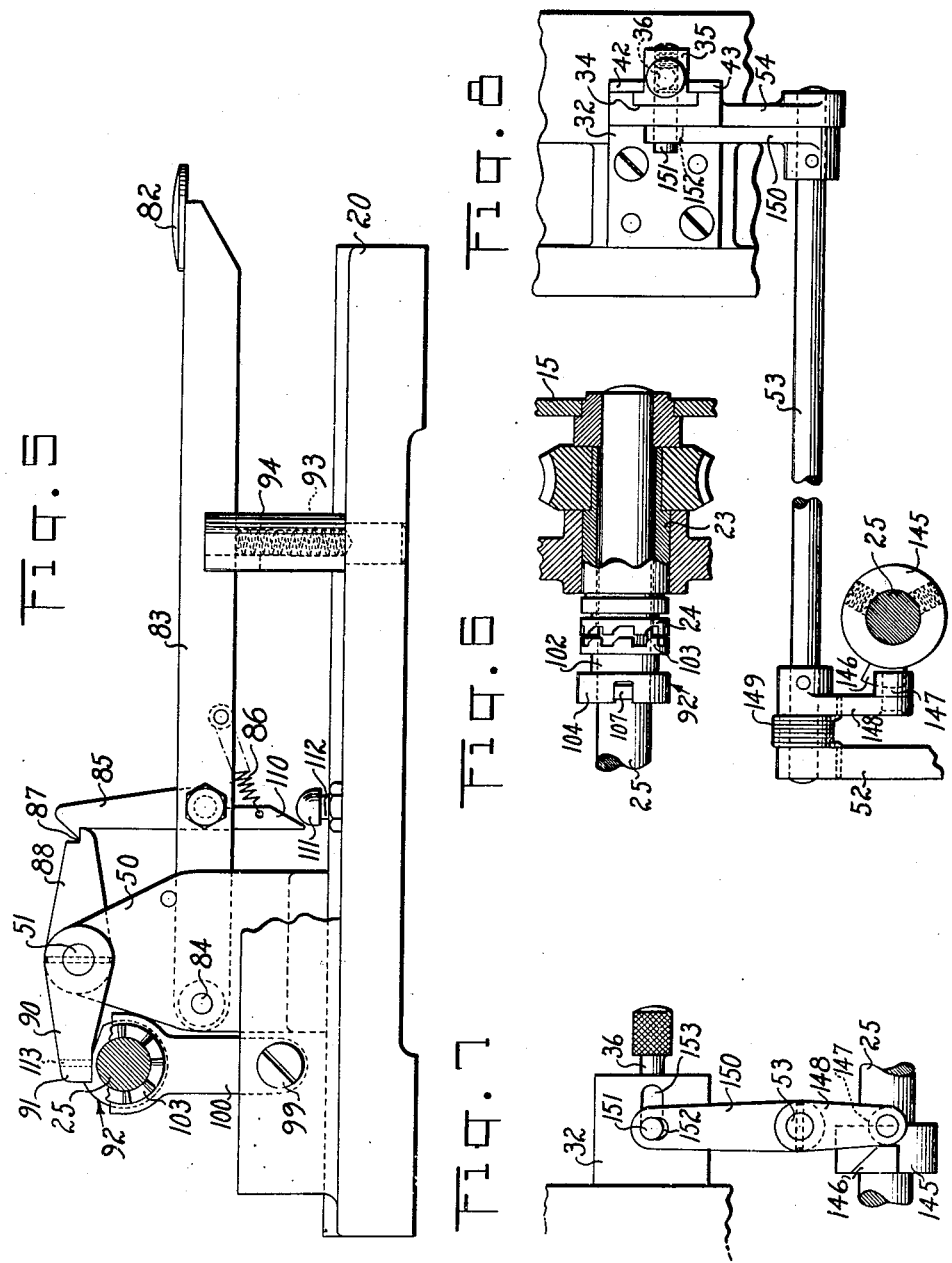
INVENTOR
OSCAR W. SODERSTROM.
BY *L. G. Julihn*
ATTORNEY

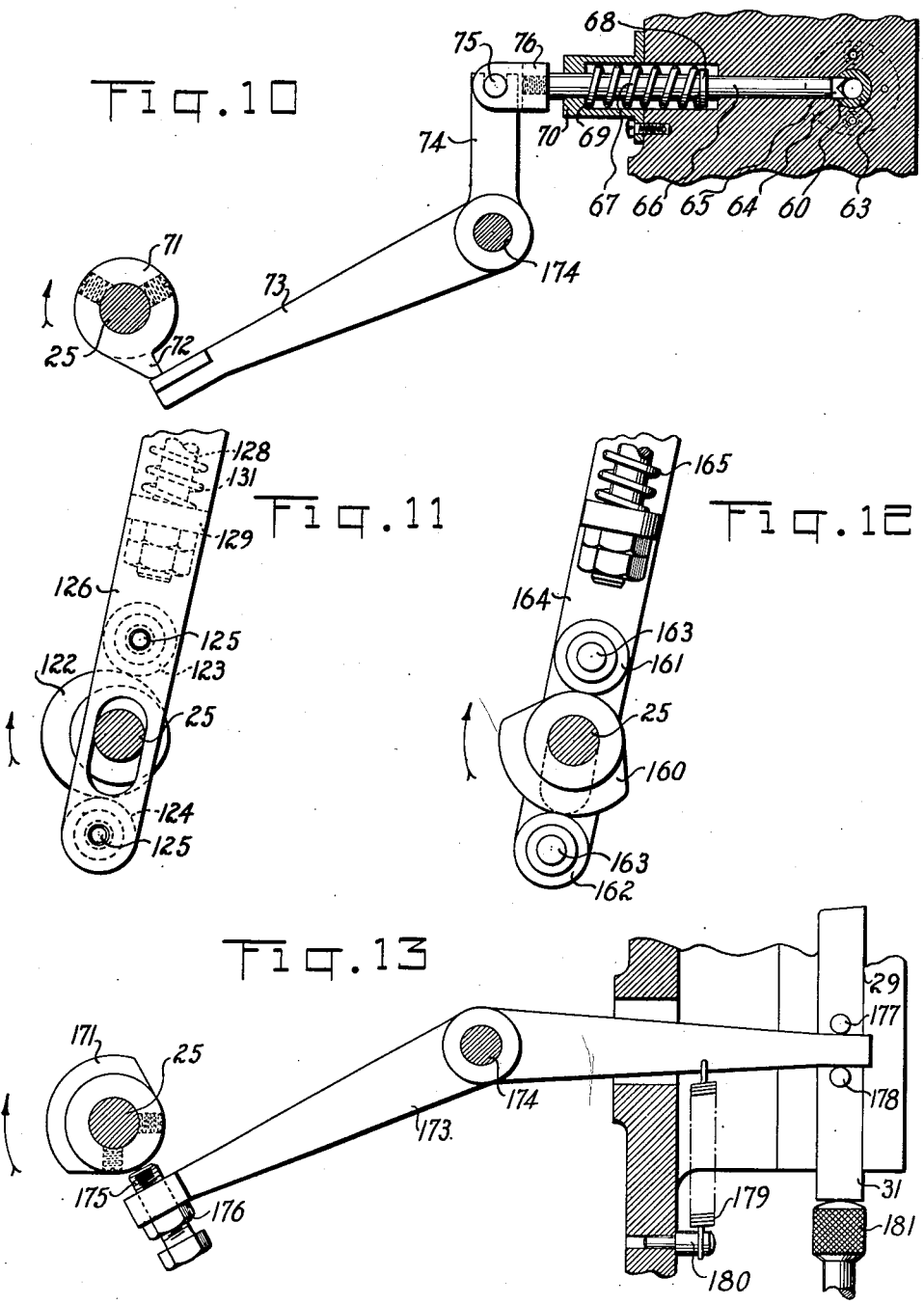

Patented July 12, 1938

2,123,752

UNITED STATES PATENT OFFICE 2,123,752

MACHINE FOR SHAPING THE ENDS OF COILED WIRE SPRINGS

Oscar W. Soderstrom, Bridgeport, Conn., assignor to Underwood Elliott Fisher Company, New York, N. Y., a corporation of Delaware Application June 13, 1936, Serial No. 85,029

11 Claims. (Cl. 140—103)

This invention relates to machines for shaping the ends of coiled wire springs and more specifically for forming loops at the spring ends.

The prevailing commercial practice prior to this invention, particularly with regard to springs of fine wire gauge and small diameter, has involved laborious hand operations, usually carried out by women operators who work with a small knife and bend the spring ends on anvils by various manipulations of the knife. The operation has been slow, requiring a fair amount of skill, and is extremely hard work.

It is an aim of the present invention to accomplish practically all of the operations of looping the end of a spring by a power driven machine leaving as the only manual operations the introduction of the wire coil to the machine and the tripping of a clutch to set the power cycle in operation.

The invention has as one of its objects to provide a simple, compact and comparatively inexpensive machine for rapidly and easily looping or otherwise shaping the end of a spring.

Another object of the invention is to provide a machine capable of easy and accurate adjustments to adapt the machine for operation on springs of varying diameters and different gauges of wire.

Other objects will be in part obvious and in part pointed out particularly hereinafter.

In the accompanying drawings wherein is shown one of various possible embodiments of the invention:—

Figure 3 is a view in top plan,

Figure 4 is a view in rear elevation,

Figure 5 is a view of the trip lever and clutch release mechanism,

Figure 1:
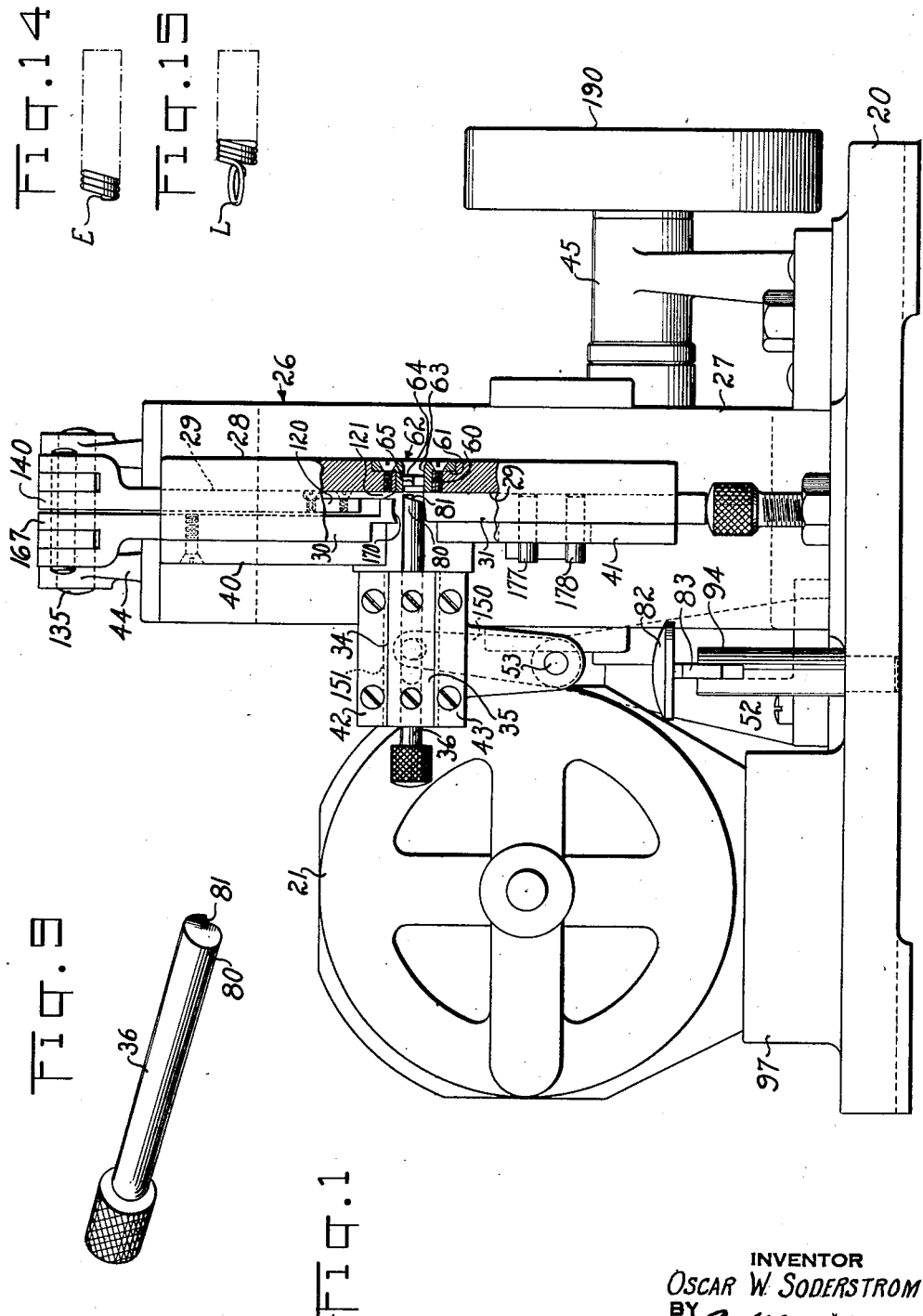
Figure 1 is a view in front elevation of a machine embodying the invention.
Figure 2:
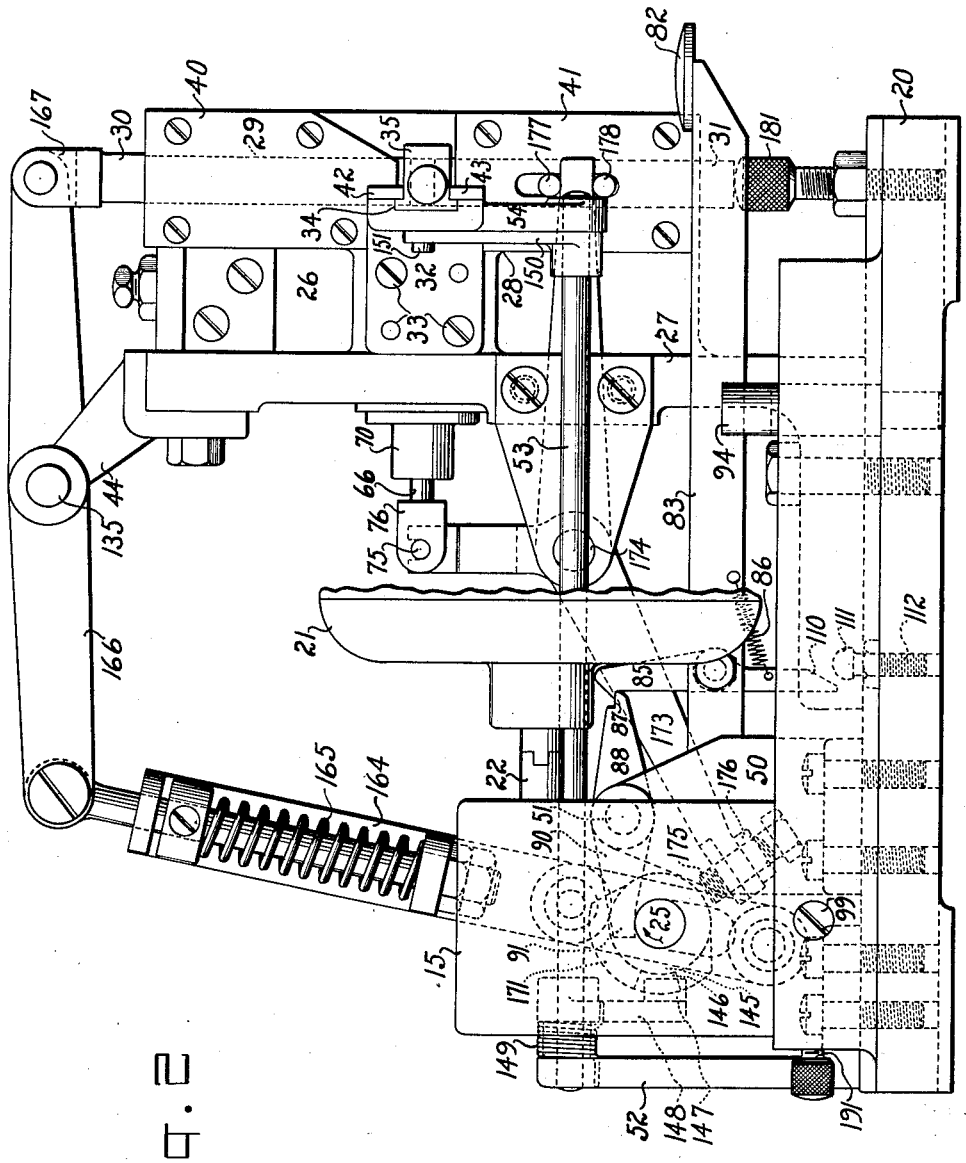
Figure 2 is a view in left side elevation of the machine shown in Figure 1.

Figure 6 is a view of the clutch mechanism showing its connection to the main cam shaft, Figure 7 is a view of the operating devices for withdrawing the locating stop after the spring blank has been clamped in proper position, Figure 8 is a view in side elevation of the mechanism shown in part in Figure 7, Figure 9 is a view in perspective of the locating stop against which the spring blank is positioned, Figure 10 is a view of the clamping mechanism for the spring blank, Figure 11 is a view of the actuating means for the blade or spreader which enters between adjacent helices at the end of the spring, Figure 12 is a view of the actuating means for an upper anvil, Figure 13 is a view of the actuating means for the lower anvil, Figure 14 is a view in elevation of a coil as it appears when introduced, and Figure 15 is a view in elevation of a coil with end loop produced by the machine.

In the preferred form of the invention shown in the accompanying drawings, a base plate 20 has a small electric motor 21 thereon with its armature shaft coupled to a short shaft 22 extending from a housing 15 also mounted on the base plate. The housing contains a reduction gearing and on one side it journals a sleeve 23 provided with a clutch element 24 adapted for continuous drive when the electric motor is energized. A main cam shaft 25 has one end journalled in the opposite side of the gear reduction housing.

Toward the front center of the machine a housing 26 is constructed, the main element of which is an upright 27 having a forwardly extending web 28 vertically grooved as indicated at 29 for the slide mounting of upper and lower anvils or plungers 30 and 31 respectively. The upright 27 also carries a slide support 32 fixed to it as indicated at 33, and the slide support is provided with a horizontal groove or slideway 34 within which a slide block 35 carrying an adjustable cylindrical stop 36 is located.

The slideways for the upper and lower anvils are closed by suitable plates 40 and 41 respectively, and plates 42 and 43 are secured to overlap the slideway 34 and serve to hold the stop block 35 in position yet allow easy sliding movement thereof in a horizontal direction.

On the upper end of the upright 27 a lever bracket 44 is mounted for the pivotal support of two levers the purpose and construction of which will be described hereinafter. A cam shaft bearing bracket 45 is secured to the base at the rear right corner and the cam shaft 25, having one end mounted in housing 15, has its other end journalled in the bracket.

A bracket 50 is fixed to the base and rises to pivotally support a rock shaft 51 which carries a part of the trip mechanism for setting the machine in operation and stopping the same at the end of its cycle. One other bracket indicated at 52 is secured to the base and rises to journal one end of a rock shaft 53 the other end of which is carried in a depending arm 54 integral with the slide support 32 in which the stop block 35 is slidably mounted.

The parts so far described constitute essentially the frame and housing of the machine and the main power drive. The various devices for manipulating the lengths of coiled wire will now be described in detail.

At the front of the machine, in the web 28 of upright 27 a circular bore 60 is provided, having a shoulder 61, and this bore is adapted to receive and have secured therein a chuck 62 comprising as one element a bushing 63 which is replaceable by other bushings of similar external shape and diameter to fit the bore but varying in internal diameter to take different sizes of coils. Through this bushing a radial slot 64 is provided to permit sliding movement of the clamp end 65 of a clamp rod 66 slidably mounted in web 28 and normally pressed inwardly by a spring 67 bearing against a flange 68 on the clamp rod and reacting against the end wall of a bore 69 in a cup 70 attached to the upright. The clamping rod is held initially retracted by a cam 71 having a high portion 72 which operates a bell crank lever 73, the upper arm of which has a forked end 74 engaging a pin 75 in a yoke 76 threaded on to the end of the clamping rod.

When the machine is not cycling the forward end 80 of the stop 36 rests adjacent the rear open end of the bushing 63 to limit the introductory movement of the coil of spring wire to the machine. This end of the stop is helical and is provided with a radial shoulder 81 and the operator in introducing the coil twists it slightly until the end of the helical coil abuts the radial shoulder. The machine is then ready for cycling which is initiated by pressing a button 82 on the forward end of trip lever 83 which is pivoted on the bracket 50 at 84 and carries a pivoted pawl 85 normally held by a spring 86 in position to engage the notched end 87 of a release pawl 88 fixed on the rock shaft 51 journalled in bracket 50. A clutch release element 90 is also secured on the rock shaft 51 and prior to the depression of the trip lever its free end 91 rests in position to oppose rotation of the cam shaft and hold a shiftable clutch element 92 out of engagement with the continuously rotating clutch 24. When the trip lever is depressed against the action of a spring 93 and guided in a slotted post 94 secured to the base, pawl 85 depresses the release pawl 88 rocking shaft 51 and lifting the clutch release member 90, whereupon a spring 95 (Figures 3 and 4) operates to engage the clutch. This spring is located in a bore 96 formed in an elevated part 97 of the base 20. A yoke carrying plunger 98 passes through this elevated portion of the base and is provided at its outer end with an enlarged head 99 to fit the bore 96. The spring bears against the head 99 and reacts against the end of the bore constantly urging the plunger outwardly or in a direction to engage the clutch. The yoke member is shown at 100 as fitted against a shoulder on the plunger and held thereon by a nut 101 threaded onto the end of the plunger. The upper yoked end of member 100 is positioned in a yoke groove 102 of the shiftable clutch element 92. This groove is between the toothed portion 103 of the clutch and a disc portion 104 which is suitably shouldered at 105 to fit into a corner 106 near the end of the clutch release element. The latter is caused to escape this shoulder when the trip lever is actuated and, when the shiftable clutch element 92 has shifted on the cam shaft as permitted by a key engagement indicated at 107 the clutch is engaged and the cam shaft commences to rotate.

The shoulder on the disc 104 then passes beyond the corner 105 of the clutch release and thereafter the clutch release element rides on the periphery of the disc. Toward the end of the downward movement of the trip lever the pawl 85 is disengaged from the release pawl 88 because of the engagement of a lower cam-faced end 110 of the pawl with a semi-spherical head 111 on a post 112 fixed to the base. Whether or not the trip lever is returned to its initial position, the machine makes but one cycle and is automatically stopped. This is due to the riding engagement of the clutch release element on the disc 104 and to an oblique face 113 at the end of the clutch release element. As the cam shaft comes toward completion of a single rotation, the shoulder 105 on the disc engages this oblique face and continued rotation of the cam shaft forces the shiftable clutch element out of engagement. Momentum carries this clutch element sufficiently in a rotative direction to locate the shoulder 105 in the corner 106 of the clutch release and thereby the cam shaft is held against further rotative movement and the clutch element is prevented from returning in an axial direction under the action of spring 95 until there is a subsequent downward movement of the trip lever.

A length of coiled wire having been introduced to the chuck 62 and rotated slightly until its end E abuts the radial shoulder of the stop 36, the trip lever is depressed, the clutch engages, and the cam shaft commences its rotation. As shown in Figure 10, the high portion of cam 71 immediately rides away from the end of bell crank lever 73 and spring 67 becomes effective to press the V-shaped end 65 of the clamp rod against the coil and urge the same against the opposite wall of the chuck. The coil is thus held with sufficient pressure against rotative or axial movements.

Shortly following the clamping operation, a spreader 120 is caused to descend slightly and its pointed end 121 passes between adjacent helices at the end of the coil. The spreader is actuated by a cam 122 (shown in Figure 11 of the drawings) fixed on the main cam shaft 25 and operating between upper and lower cam rollers 123 and 124, both of which are loosely mounted by studs 125 on a bar 126 which has its upper end 127 offset and through which offset end a rod 128 passes downwardly through a web 129 welded, riveted or otherwise suitably secured to the bar about midway of its length. A collar 130 is secured to the rod between the offset end of the bar and the web and a coiled compression spring 131 bears against the lower face of the collar and reacts against the web. The upper end of the rod is formed with an eye 132 and is secured by a stud 133 to a lever 134 fulcrumed on a short shaft 135 carried in the lever bracket 44. The forward end of the lever is fitted into a yoked upper end 140 of the spreader bar 120 located in the slideway 29 of the housing. Secured to the lower end of this bar and projecting downwardly is the pointed end spreader or blade previously referred to. It will be noted that the transmission to the spreader, in accordance with the structure described, is through the spring 131 which is comparatively heavy and not intended to function particularly in the downward movement of the spreader but does function as the spreader retreats, in a manner which hereinafter will be described.

Simultaneously with the commencement of the downward movement of the spreader, or if desired, shortly before this movement starts, the stop member 36 is caused to retreat by effecting a movement of the slide block 35 to which this stop member is secured. The mechanism for effecting this movement is shown in Figures 1, 7 and 8. It comprises a cam 145 fixed on the cam shaft having a lobe 146 initially holding the stop in its advanced position. When the cam shaft rotates, the lobe passes beyond a cam roller 147 on an arm 148 fixed on rock shaft 53 and a torsion spring 149 rocks the arm and the shaft to rock another arm 150 at the opposite end of the rock shaft. This moves the slide block 35 through connections comprising a pin 151 fixed in the slide block and extending into a short radial slot 152 in the upper end of the arm 150. The housing member which provides the slideway for the stop is also slotted at 153 to permit this movement of the pin.

It will be obvious that different positions of rotative adjustment of the stop member allow for different rotative positioning of the end of the coil of wire so that the actual length of wire separated from the remainder of the coil may be varied to suit. Ordinarily the stop is positioned rotatively to provide for separating a length of wire corresponding to about one and one half turns. Such an amount provides for the formation of a closed loop at the end of the spring as the various other operations are carried out. If it is desired to form an open loop the stated adjustment may be made to provide for this. Furthermore, it should be noted that by reason of the possibility of longitudinal or axial adjustment of the stop rod, coil springs of varying gauges of wire may be accommodated. Thus, it will be seen that by varying the bushing sizes and making the possible adjustments of the stop, both rotatively and axially, a range of different coils may be operated upon in this machine.

The spreader is advanced by its cam until the spread end of the coil is in an oblique position with its upper part directly under and in the path of the upper anvil 30. This anvil is now caused to descend slightly in retard of the spreader by a cam 160 (shown in Figure 12) fixed to the cam shaft 25 and operating between upper and lower rollers 161 and 162 respectively, pivoted by studs 163 to a bar 164. This bar and its connections correspond in shape and construction to the bar and connections employed in transmitting movement to the spreader. A compression spring 165 is employed, provided for the possibility of yield of the upper anvil when desired. The transmission of movement is through a lever 166 supported on shaft 135 at the top of the machine and having its opposite end fitted in the yoked upper end 167 of the upper anvil.

The upper anvil descends, bending over the spread end of the coil, and in doing so the anvil movement is accelerated somewhat relative to the spreader movement so that at the lower extreme of the movement of both spreader and upper anvil the lower ends of each are practically on a level. It has been found desirable to slightly concave the lower anvil end of the anvil plunger, as indicated at 170 in Figure 1. This prevents jamming of the spread coil and facilitates its bending to a substantially horizontal position in a plane with the lower side of the coiled wire blank.

According to the present described embodiment of the invention, the lower anvil 31 is now caused to rise in the slideway 29 under the action of a cam 171 (see Figure 13). This cam, fixed to the main cam shaft 25, operates a lever 173 fulcrumed on a shaft 174 which also fulcrums the clamp-operating lever. The end of the lever cooperative with the cam has a bolt 175 threaded therein to provide an adjustment toward and from the cam and the bolt is securable in adjusted position by a lock nut 176. The opposite end of the lever is positioned between upper and lower pins 177 and 178 projecting from the lower anvil. A spring 179 has its lower end connected to a pin 180 on the housing and its upper end connected to the lever to urge the lower anvil downwardly against an adjustable stop 181 threaded into the base plate.

Continuing the cycle of operation, the cam 171 acts upon the lever 173 to move the lower anvil upwardly during which movement the end loop of the wire coil is held between the combined face presented by the upper anvil and spreader point on the one side, and the lower anvil on the other side. Continued upward movement of the lower anvil forces the looped end of the spring upwardly during which time the upper anvil and spreader are caused to retreat by the advancing lower anvil and against the opposition of the compression springs 131 and 165 of the respective connections. This upward movement is continued as the main body of the coil is held fast in the chuck and until the looped spring end L assumes a position substantially coincident the median plane of the coiled body, and at this point the spreader and upper anvil are again picked up by their respective cams and caused to retreat to their initial positions. At the same time the lower anvil retreats downwardly to the stop owing to the controlling lever 173 passing beyond the high point of its cam, allowing the spring 179 to become effective. As soon as the anvils have sufficiently separated, the lobe 146 of cam 145 acts on the roller carried by arm 148 and urges it in opposition to the torsion spring 149, rocking the shaft 53 and causing the slide of the stop 36 to be advanced to present the stop for the next operation. Substantially simultaneously with this movement the clamp plunger is withdrawn by the high part of cam 71 acting upon the lever 73 and the stop 36 in its forward movement ejects the end-looped spring. Immediately following this the shiftable clutch element 92 is automatically disengaged as previously herein described, and the machine is ready for operation upon the opposite end or upon another coil.

In making the various adjustments permitted by the mechanism to accommodate coils of different sizes and gauges of wire it is desirable to maintain the parts of the clutch in position of disengagement. To turn the cam shaft over by hand a wheel 190 is provided and when the clutch parts are separated this wheel may be used to move the cam shaft rotatively and operate the various actuating mechanisms which could not be operated if the clutch were engaged owing to the reducing gearing comprising a worm and worm wheel in the housing 15. To temporarily secure the clutch in a position of disengagement a screw 191 is tapped into the platform 97 of the base and this screw may be turned to temporarily hold the yoke carrying plunger 98 against the action of spring 95 by engaging the point of the screw with the headed end 99 of the plunger.

Although the stop 36 is adapted to function with a small range of varying diameters of coils, it is within the intent of the present invention to use stop plungers of larger or smaller diameter as may be required by the size of the coil to be operated upon, and this stop plunger and its slide block may be replaced by another of the size and shape desired to suit the different sizes of coils and the different sizes of bushings employed.

What is claimed is:

1. A machine for shaping coiled spring ends, comprising an electric motor and a clutch element driven thereby, a cooperative clutch element initially disconnected with the first said clutch element, actuating means for spring-end shaping means, means comprising a trip for causing engagement of said clutch elements upon actuation of the trip, spring-end shaping means comprising anvils, and means for automatically disengaging the clutch elements after the spring end has been shaped by the anvils.

2. A machine for shaping coiled spring ends, comprising an electric motor and a clutch element driven thereby, a cooperative clutch element initially disconnected with the first said clutch element, actuating means for spring-end shaping means, a stop for limiting the introduction of a spring and for determining its proper position rotatively, means comprising a trip for causing engagement of said clutch elements upon actuation of the trip, spring-end shaping means comprising anvils, and means for automatically disengaging the clutch elements after the spring end has been shaped by the anvils.

3. A machine for shaping coiled spring ends, comprising an electric motor and a clutch element driven thereby, a cooperative clutch element initially disconnected with the first said clutch element, actuating means for spring-end shaping means, a stop for limiting the introduction of a spring and for determining its proper position rotatively, said stop being adjustable longitudinally and rotatively to adapt the machine for operation on varying end lengths of springs and varying gauges of wire, means comprising a trip for causing engagement of said clutch elements upon actuation of the trip, spring-end shaping means comprising anvils, and means for automatically disengaging the clutch elements after the spring end has been shaped by the anvils.

4. A machine for forming a looped end on a wire coil, comprising a base, a motor mounted thereon, a clutch element driven by the motor, a cooperative clutch element initially disengaged from the first said clutch element, a housing on said base having a chuck for receiving and holding a wire coil, a stop for determining the position of the wire coil in said housing, a blade adapted to enter between adjacent helices at the end of said coil and spread the end of the coil from the body, anvils operative on the spread end to set it in desired position, actuating means for said spreader and said anvils operative when said clutch elements are engaged, a trip for releasing the initially disengaged clutch element, and means for causing its movement into position of engagement when released.

5. A machine for shaping coiled spring ends, comprising motor means, a clutch, a chuck, and means for spreading an end helix from a coil held in said chuck and setting it lengthwise of the coil, the last said means including the said motor means, clutch engaging means, clutch disengaging means, a blade adapted to pass between adjacent helices at the end of the coil and opposed anvils movable with the spread end of the coil held between them.

6. A machine for shaping coiled spring ends, comprising means for spreading an end helix from a coil and adjustable means having provision for locating the coil in a predetermined position rotatively and longitudinally, said means comprising a stop having a substantially helical end face and a shoulder projecting from said face to provide an abutment for a coil end.

7. A machine for shaping coiled spring ends, comprising an electric motor, a receiving bushing, an operating lever for connecting the motor in the machine, and shaping means actuated by the motor to set an end helix of the coil lengthwise thereof, said means including an anvil which in its actuation moves the end helix through an angle of substantially 90°, another anvil which subsequently moves the end helix to a plane substantially coincident with the axis of the coil, and spring means opposing the last said movement.

8. A machine for shaping coiled spring ends comprising a stop serving to limit introductory movement of the spring, a clamp for the spring, motor means, means actuated by said motor means adapted to spread an end helix of the spring from the body thereof and shape it in the form of a loop substantially parallel with the axis of the spring, means causing said stop to retract after the spring has been clamped, and means for advancing said stop to eject the spring when it is unclamped.

9. A machine for shaping coiled spring ends, comprising means for holding a coil, yielding means for turning an end of the coil away from the coil body, an opposed anvil, and means for advancing the opposed anvil against the opposition of said yielding means after the end of the coil has been turned.

10. A machine for shaping coiled spring ends, comprising means for holding a coil with its end exposed to a spreader, a spreader adapted to enter between adjacent helices at the coil end, an anvil, means to advance the anvil to turn the spread end of the coil, a second anvil against which the end of the coil is forced in turning, and means adapted to cause the second anvil to advance in a direction opposed to the first said anvil as the latter retreats, with the turned end held between the two anvils.

11. A machine for shaping coiled spring ends, comprising a stop serving to limit introductory movement of the spring, a clamp for the spring, motor means, means actuated by said motor means adapted to spread an end helix of the spring from the body thereof and shape it in the form of a loop substantially parallel with the axis of the spring, and means causing said stop to retract after the spring has been clamped to allow the spreading and shaping means to move in the path formerly occupied by the stop.

OSCAR W. SODERSTROM.